(12) United States Patent
Susnow

(10) Patent No.: US 6,438,728 B1
(45) Date of Patent: Aug. 20, 2002

(54) ERROR CHARACTER GENERATION

(75) Inventor: Dean S. Susnow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,395

(22) Filed: Dec. 15, 1999

(51) Int. Cl.[7] .............................................. G06F 11/00
(52) U.S. Cl. ...................................... 714/807; 714/808
(58) Field of Search ..................... 341/95, 58; 714/798, 714/784, 807, 806, 808

(56) References Cited

U.S. PATENT DOCUMENTS

| | | | |
|---|---|---|---|
| 4,486,739 A | 12/1984 | Franaszek et al. ............. | 341/59 |
| 4,573,034 A | * 2/1986 | Immink ........................ | 341/95 |
| 4,975,916 A | * 12/1990 | Miracle et al. ............. | 714/798 |
| 5,130,990 A | * 7/1992 | Hsu et al. .................... | 714/784 |
| 5,699,062 A | * 12/1997 | Widmer ........................ | 341/58 |
| 5,802,080 A | * 9/1998 | Westby ....................... | 714/807 |

OTHER PUBLICATIONS

A. Widmer et al., "A DC–Balanced, Partitioned–Block, 8B/10B Transmission Code", *IBM J. Res. Develop.*, vol. 27, No. 5, Sep. 1983, pp. 441–451.

* cited by examiner

*Primary Examiner*—David Ton
(74) *Attorney, Agent, or Firm*—Antonelli, Terry, Stout & Kraus, LLP

(57) ABSTRACT

In an error generating circuit and method for generating a 10-bit error character to test 8B/10B decoders, a character generator receives a two-state mode control signal and a two-state disparity control signal and generates a 10-bit error character of a type dependent upon the states of the disparity control signal and the mode control signal. The four types of error characters that can be generated are an invalid 10-bit character having positive disparity, an invalid 10-bit character having negative disparity, a valid 10-bit character having positive disparity, and a valid 10-bit character having negative disparity. A test circuit incorporates the error generating circuit and an 8-bit/10-bit encoder and provides a valid 10-bit character or an 10-bit error character, depending upon the state of an enable signal.

17 Claims, 3 Drawing Sheets

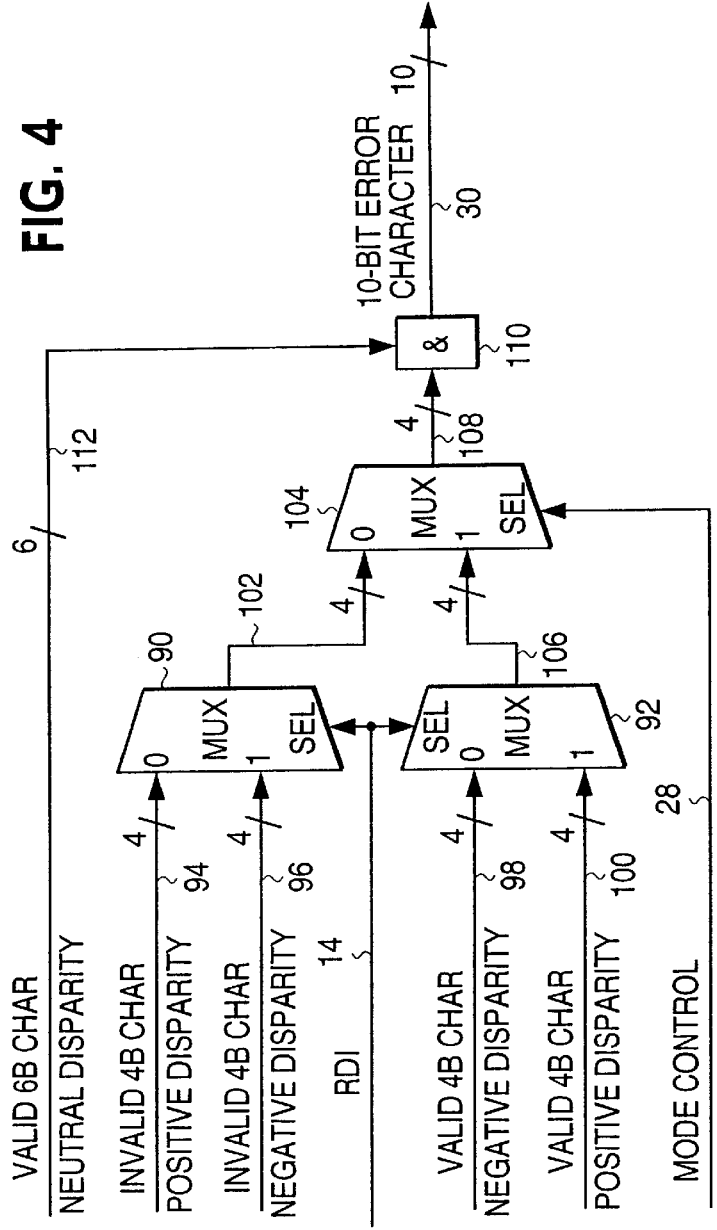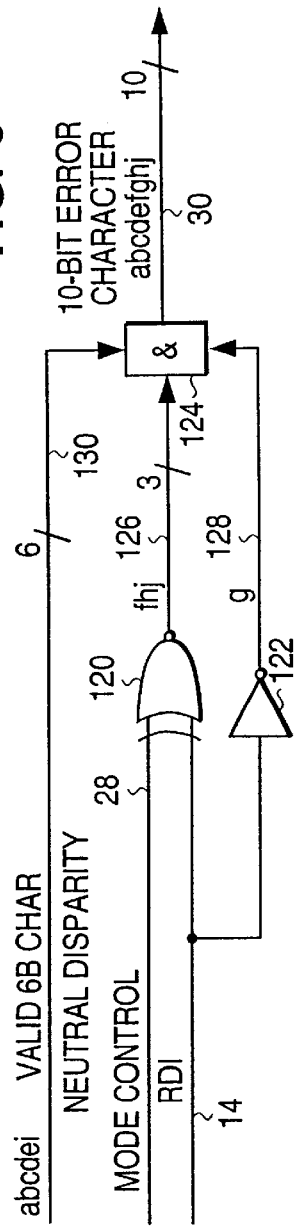

US 6,438,728 B1

ERROR CHARACTER GENERATION

FIELD

The present invention pertains to an error generating circuit and method, for generating a 10-bit error character to test 8-bit/10-bit decoders.

BACKGROUND

Communication networks often utilize 8-bit/10-bit ("8B/10B") encoders and decoders to improve reliability. An 8B/10B encoder encodes received eight bit bytes of binary data into ten bit bytes plus a disparity bit which indicates whether there is a difference between the number of ones and the number of zeros in the ten bit byte. Conversely, an 8B/10B decoder converts ten bit bytes of binary data into eight bit bytes plus a disparity bit. 8B/10B encoders and decoders are described, for example, in the U.S. Pat. No. 4,486,739 and in an article "A DC/Balanced, Partitioned-Block, 8B/10B Transmission Code," by A. X. Widmer and T. A. Franaszek, IBM Journal of Research and Development, Volume 25, No. 5 (September 1983), pages 440–451.

A typical 8B/10B encoder receives eight bit bytes of binary input data and an input disparity bit, encodes the eight bit bytes to ten bit data in accordance with the input disparity bit, and calculates the disparity of the ten bit byte to provide an output disparity bit that determines how to encode the next eight bit input byte. The output disparity bit indicates whether the ten bit byte has more ones than zeros (positive disparity), more zeros than ones (negative disparity), or an equal number of ones and zeros (neutral disparity). Similarly, a typical 8B/10B decoder receives ten bit bytes of data and an input disparity bit, decodes the ten bit bytes to eight bit bytes in accordance with the input disparity bit, and calculates the disparity of the ten bit input byte to provide an output disparity bit that determines how to decode the next ten bit input byte. 8B/10B encoders and decoders are standard protocol on many serial communication networks. 8B/10B decoders must be capable of detecting error characters in the event a transmission error or an error in encoding or decoding occurs. Thus, it is desirable to be able to test 8B/10B decoders to assure that they properly recognize error characters. Two types of error character might occur. With each successive byte of data to be decoded, the disparity should either change or remain neutral. Thus, for example, if one byte has positive disparity, the next byte must have either negative or neutral disparity. The first type of error character is an invalid 8B/10B character which has correct disparity. This is a character which is not allowed in the 8B/10B character alphabet. The second type of error which can be generated is a valid 8B/10B character that is unacceptable due to a disparity error. It is desirable to be able to generate error characters of both types in order to test 8B/10B decoders. In addition, such error characters can be utilized when checking the design of a new 8B/10B decoder, for example, in a "debugging" process.

SUMMARY

The present invention is an error generating circuit and method for generating a 10-bit error character to test 8B/10B decoders. In the circuit and method, a character generator receives a two-state mode control signal and a two-state disparity control signal and generates a 10-bit error character of a type dependent upon the states of the disparity control signal and the mode control signal. That is, when the disparity control signal is in its first state and the mode control signal is in its first state, the character generator generates a 10-bit error character of a first type; when the disparity control signal is in its second state and the mode control signal is in its first state, the character generator generates a 10-bit error character of a second type; when the disparity control signal is in its first state and the mode control signal is in its second state, the character generator generates a 10-bit error character of a third type, and when the disparity control signal is in its second state and the mode control signal is in its second state, the character generator generates a 10-bit error character of a fourth type. The four types of error characters that can be generated are an invalid 10-bit character having positive disparity, an invalid 10-bit character having negative disparity, a valid 10-bit character having positive disparity, and a valid 10-bit character having negative disparity.

BRIEF DESCRIPTION OF THE DRAWINGS

These and other aspects and advantages of the present invention are more apparent from the following detailed description and claims, particularly when considered in conjunction with the accompanying drawings. In the drawings:

FIG. 4 is a block diagram of a third embodiment of an error character generator in accordance with the present invention; and FIG. 5 is a block diagram of a preferred embodiment of an error character generator in accordance with the present invention.

DETAILED DESCRIPTION

Figure 1:
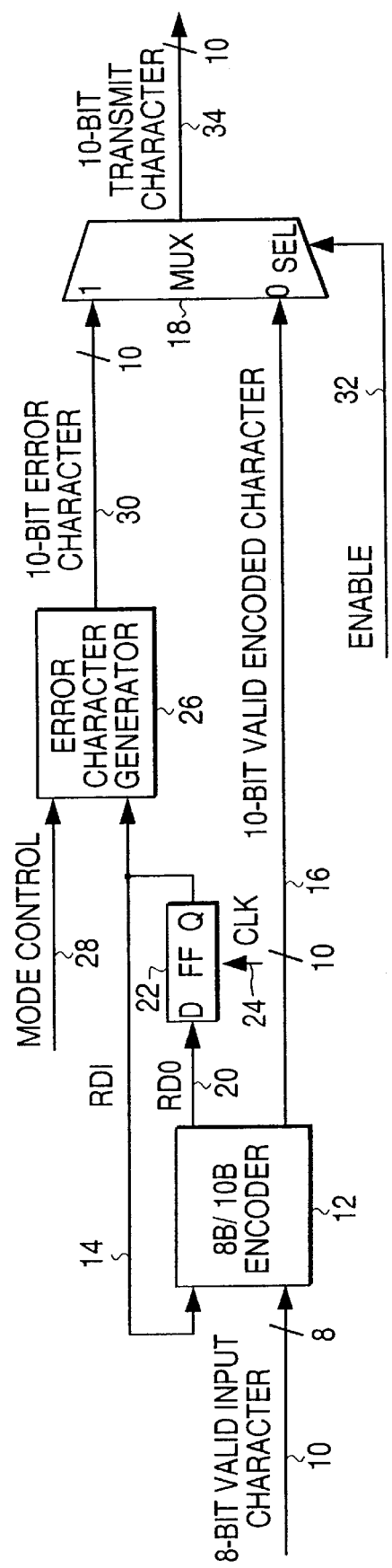
FIG. 1 is a block diagram of a system in accordance with a preferred embodiment of the present invention for transmitting both valid and invalid 10-bit characters in order to test an 8B/10B decoder.

FIG. 1 is a block diagram of a preferred embodiment of a system in accordance with a preferred embodiment of the present invention for generating a character stream including both valid 10-bit characters and 10-bit error characters to test 8B/10B decoders. Valid 8-bit input characters are applied on line 10 to 8B/10B encoder 12 which encodes the 8-bit characters in accordance with a running disparity input (RDI) signal applied to encoder 12 on line 14. The resulting valid 10-bit encoded character is applied on line 16 to the 0 input of multiplexer 18. 8B/10B encoder 12 also applies a running disparity output (RDO) signal on line 20 to the D input of flip-flop 22 which receives the clock signal on line 24. The Q output of flip-flop 22 is connected by line 14 to encoder 12 to provide the RDI signal. The RDI signal is also applied by line 14 to error character generator 26 which additionally receives a two-state mode control signal on line 28.

Error character generator 26 generates a 10-bit error character and applies it on line 30 to the 1 input of multiplexer 18. A two-state enable signal is applied on line 32 to the select input of multiplexer 18. When the enable signal is not present, or is a binary 0, multiplexer 18 outputs the 10-bit valid character from encoder 12 on its output line 34 for application to an 8B/10B decoder. Conversely, when the enable signal on line 32 is present, or is a binary 1, multiplexer 18 outputs the 10-bit error character from line 30 on its output line 34 for application to an 8B/10B decoder.

In operation, 8B/10B encoder 12 encodes the 8-bit valid input characters applied to it on line 10 and applies the resulting 10-bit valid encoded characters on line 16 to the 0 input of multiplexer 18. Error character generator 26 generates 10-bit error characters in accordance with the states of the RDI signal and the mode control signal, and applies the error characters on line 30 to the 1 input of multiplexer 18. When the enable signal on line 32 is not present, or binary 0, the 10-bit valid character from encoder 12 is output on line 34. When the enable signal on line 32 is present, or binary 1, the 10-bit error character from generator 26 is output on line 34.

Error character generator 26 must be able to generate either of the two types of error characters, based on the state of the mode control signal on line 28. If the mode control signal is a binary 0, then error character generator 26 is to generate an invalid 10-bit character having a valid running disparity. If the mode control signal is a binary 1, then error character generator 26 is to generate a valid 10-bit character having an invalid running disparity.

The RDI input to 8B/10B encoder 12 determines the valid character to be provided by 8B/10B encoder 12 based on whether the last encoded character was of positive disparity or negative disparity. If the RDI signal is negative, then the next valid encoded character must be of either positive disparity or neutral disparity, and an encoded character of negative disparity should be detected by the receiving decoder as an error character. Conversely, if the RDI signal is positive, then the next valid encoded character must have either negative disparity or neutral disparity, and an encoded character having a positive disparity should be detected by the receiving 8B/10B decoder as an error character. If the last character was of neutral disparity, then the RDI signal is not required to change.

Combining the requirements of the mode control signal and the requirements of the RDI signal determines the types of error characters that error character generator 26 must be capable of providing. Table 1 summarizes the requirements.

TABLE 1

| Mode Control Signal | RDI Signal | Function |
| --- | --- | --- |
| 0 | Negative | Generate an invalid 10-bit character of either neutral disparity or positive disparty |
| 0 | Positive | Generate an invalid 10-bit character of either neutral disparity or negative disparity. |
| 1 | Negative | Generate a valid 10-bit character of negative disparity. |
| 1 | Positive | Generate a valid 10-bit character of positive disparity. |

Figure 2:
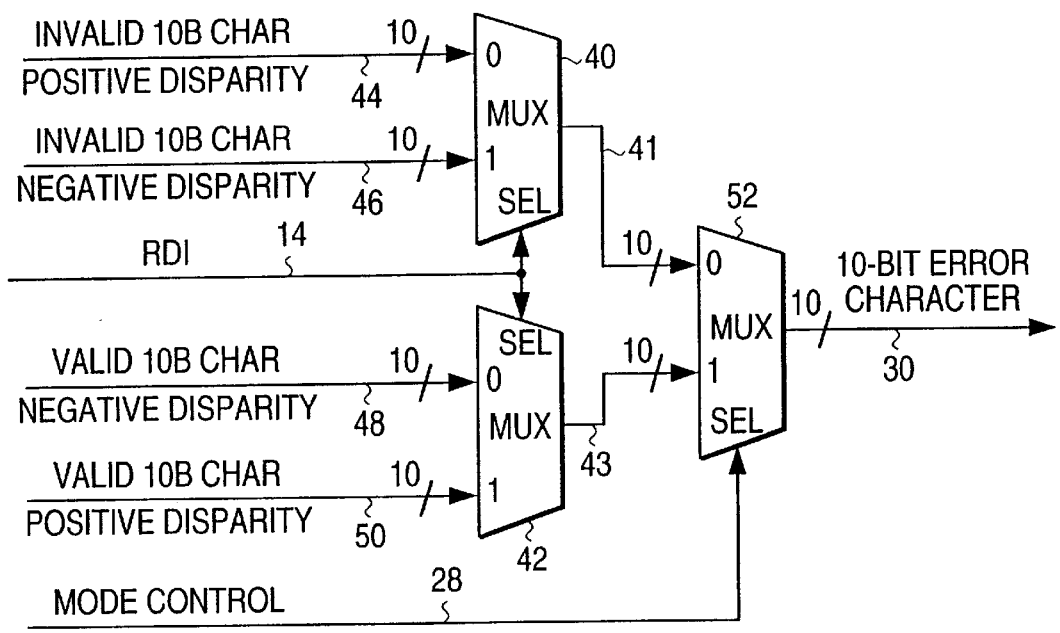
FIG. 2 is a block diagram of a first embodiment of an error character generator in accordance with the present invention.

FIG. 2 is a block diagram of a first embodiment of an error character generator satisfying the requirements of Table 1 and thus suitable for use as error character generator 26. The RDI signal on line 14 is applied to the select input of a first multiplexer 40 and the select input of a second multiplexer 42. An invalid 10-bit character of positive disparity is applied on line 44 to the 0 input of multiplexer 40, while an invalid 10-bit character of negative disparity is applied on line 46 to the 1 input of multiplexer 40. A valid 10-bit character of negative disparity is applied on line 48 to the 0 input of multiplexer 42, and a valid 10-bit character of positive disparity is applied on line 50 to the 1 input of multiplexer 42. The output of multiplexer 40 is applied on line 41 to the 0 zero input of multiplexer 52, while the output of multiplexer 42 is applied on line 43 to the 1 input of multiplexer 52. The mode control signal on line 28 is applied to the select input of multiplexer 52. The output of multiplexer 52 is the 10-bit error character on line 30.

When the RDI signal on line 14 is negative or a binary 0, multiplexer 40 provides the invalid 10-bit character of positive disparity on line 44 as its output signal on line 41 to the 0 input of multiplexer 52, and multiplexer 42 provides the valid 10-bit character with negative disparity on line 48 as its output signal on line 43 to multiplexer 52. When the RDI signal on line 14 is positive or binary 1, multiplexer 40 provides the invalid 10-bit character with negative disparity on line 46 as its output signal on line 41 to multiplexer 52, and multiplexer 42 provides the valid 10-bit character with positive disparity on line 50 as its output signal on line 43 to multiplexer 52. When the mode control signal on line 28 is a binary 0, multiplexer 52 applies the output of multiplexer 40 as the 10-bit error character. When the mode control signal is a binary 1, multiplexer 52 applies the output of multiplexer 42 as the 10-bit error character. Thus, the circuit of FIG. 2 satisfies the requirements of Table 1.

The error character generator of FIG. 2 requires three multiplexers for each of the 10-bits in the error character. Each multiplexer requires three logic gates for mechanization. Consequently, mechanization of the error character generator of FIG. 2 requires 90 logic gates. An understanding of the manner in which 8B/10B codes are generated leads to a reduction in the number of logic gates required. In an 8B/10B encoder, the encoded character determines the actual value of the character disparity. That value determines the RDI signal which is applied to a 5-bit/6-bit encoding section to determine six bits of the next encoded characters. A temporary disparity of this 6-bit segment is determined and used as an input to a 3-bit/4-bit encoding section to determine the final 4-bits of the 10-bit encoded character. The 6-bit character may have positive, negative or neutral disparity, depending upon the 8-bit input byte and the RDI signal. By selecting a valid 6-bit character having a neutral disparity, the mechanization of the error character generator can be simplified. All neutral 6-bit codes are the same independent of the RDI signal. Utilizing a 6-bit code that is disparity neutral permits elimination of six of the multiplexers, and thus 18 of the logic gates, required by the mechanization of FIG. 2.

Figure 3:
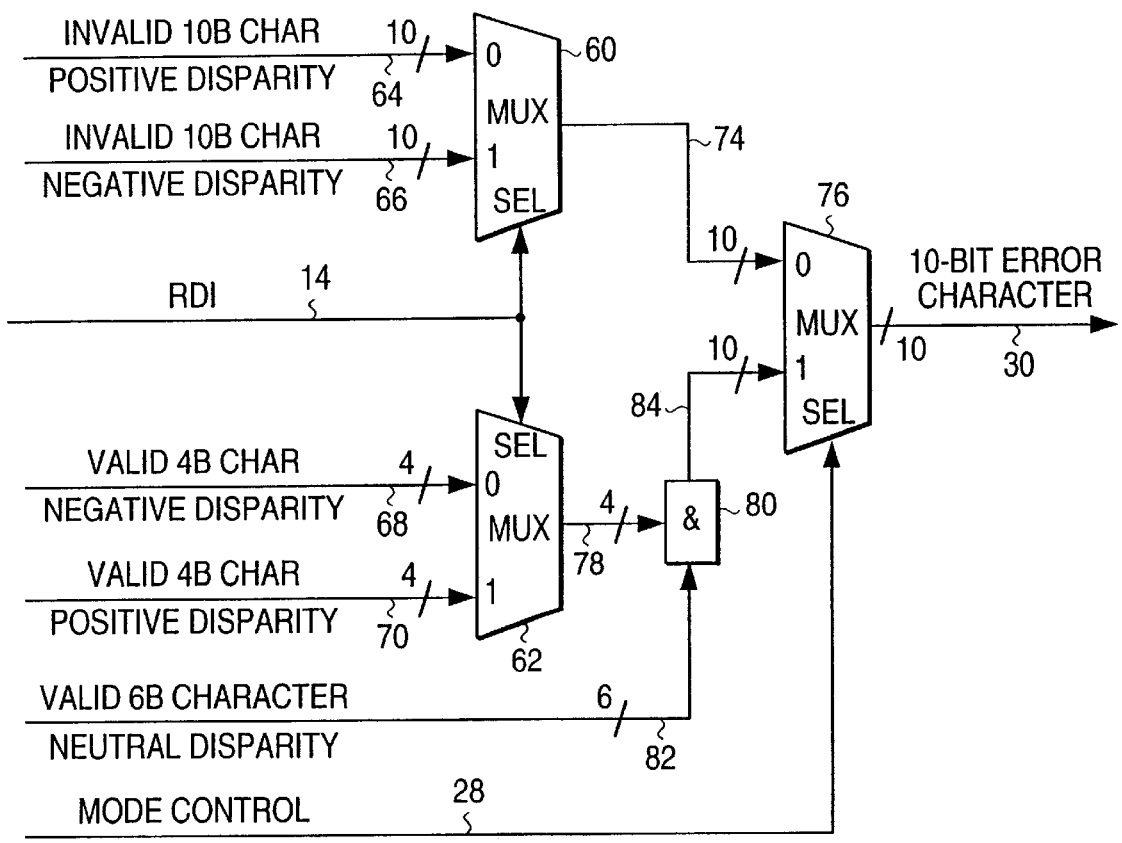
FIG. 3 is a block diagram of a second embodiment of an error character generator in accordance with the present invention.

FIG. 3 depicts the resulting error character generator, which likewise can be used as error character generator 26. In the error character generator of FIG. 3, the RDI signal on line 14 is applied to the select input of multiplexer 60 and the select input of multiplexer 62. An invalid 10-bit character with positive disparity is applied on line 64 to the 0 input of multiplexer 60, while an invalid 10-bit character of negative disparity is applied on line 66 to the 1 input of multiplexer 60. A valid 4-bit character with negative disparity is applied on line 68 to the 0 input of multiplexer 62, and a valid 4-bit character with positive disparity is applied on line 70 to the 1 input of multiplexer 62. The output of multiplexer 60 is applied by line 74 to the 0 input of multiplexer 76. The output of multiplexer 62 is applied by line 78 to combining circuit 80, which also receives a valid 6-bit character with neutral disparity on line 82. The resulting 10-bit character is applied on line 84 to the 1 input of multiplexer 76. The mode control signal on line 28 is applied to the select input of multiplexer 76. The output of multiplexer 76 is the 10-bit error character on line 30.

When the RDI signal on line 14 is negative, or binary 0, multiplexer 60 outputs the invalid 10-bit character with positive disparity from line 64, and multiplexer 62 outputs the valid 4-bit character with negative disparity from line 68. When the RDI signal is positive, or binary 1, multiplexer 60 outputs the invalid 10-bit character with negative disparity from line 66, and multiplexer 62 outputs the valid 4-bit character with positive disparity from line 70. When the mode control signal on line 28 is a binary 0, multiplexer 76 outputs the output of multiplexer 60 as the 10-bit error character on line 30. When the mode control signal is a binary 1, multiplexer 76 outputs the combination of the output of multiplexer 62 on line 78 and the valid 6-bit character of neutral disparity on line 82 as the 10-bit error character.

Multiplexer 60 must be able to multiplex two 10-bit input characters, and requires 3 logic gates for each character. Consequently, multiplexer 60 requires 30 logic gates. Multiplexer 62 must multiplex two 4-bit characters, and requires three logic gates per character, thus requiring a total of 12 logic gates. Multiplexer 76 must multiplex two 10-bit input bytes, utilizing three logic gates per byte, and so requires 30 logic gates. Four of the 10 input bits to the 1 input of multiplexer 76 come from the output of multiplexer 62, while the remaining six are the valid 6-bit character with a neutral disparity from line 82. Combining circuit 80, in fact, represents the inputs to ten of the logic gates of multiplexer 76, and so does not require separate mechanization. Mechanization of the error character generator of FIG. 3 thus requires 72 logic gates.

The number of logic gates required can be further reduced by selecting an efficient invalid character of correct running disparity for generation when the mode control signal is binary 0. An error character can be generated by corrupting either the 6-bit portion or the 4-bit portion of the character. Utilizing a valid 6-bit portion requires corrupting the 4-bit portion of the encoded character. Selecting the same neutral 6-bit portion when the mode control signal is a binary 3 greatly reduces the number of logic gates required. Regardless of the state of the RDI signal or the state of the mode control signal, the same 6-bit character portion is utilized. This results in elimination of another 12 of the multiplexers, and thus 36 logic gates, from the mechanization of FIG. 3. FIG. 4 depicts this mechanization.

In the error character generator of FIG. 4, the RDI signal on line 14 is applied to the select input of multiplexer 90 and the select input of multiplexer 92. An invalid 4-bit character with positive disparity is applied on line 94 to the 0 input of multiplexer 90, while an invalid 4-bit character with negative disparity is applied on line 96 to the 1 input of multiplexer 90. A valid 4-bit character with negative disparity is applied on line 98 to the 0 input of multiplexer 92, and a valid 4-bit character with positive disparity is applied on line 100 to the 1 input of multiplexer 92. The output of multiplexer 90 is applied by line 102 to the 0 input of multiplexer 104. The output of multiplexer 92 is applied by line 106 to the 1 input of multiplexer 104. The mode control signal on line 28 is applied to the select input of multiplexer 104. The output of multiplexer 104 is applied by line 108 to combining circuit 110 which also receives a valid 6-bit character with neutral disparity on line 112. The output of combining circuit 110 is the 10-bit error character on line 30. In fact, combining circuit 110 requires no implementation; the ten conductors comprising line 30 are the four conductors of line 108 and the six conductors of line 112.

When the RDI signal on line 14 is negative or binary 0, multiplexer 90 outputs the invalid 4-bit character with positive disparity from line 94, and multiplexer 92 outputs the valid 4-bit character with negative disparity from line 98. When the RDI signal is positive or binary 1, multiplexer 90 outputs the invalid 4-bit character with negative disparity from line 96, and multiplexer 92 outputs the valid 4-bit character with positive disparity from line 100. When the mode control signal on line 28 is a binary 0, multiplexer 104 outputs the 4-bit output of multiplexer 90, and when the mode control signal is a binary 1, multiplexer 104 outputs the 4-bit output of multiplexer 92. At combining circuit 110, the 4-bit output of multiplexer 104 is combined with the valid 6-bit character of neutral disparity from line 112 to provide the 10-bit error character on line 30.

Mechanization of the error character generator of FIG. 4 requires 3 sets of multiplexers, each set capable of multiplexing two 4-bit inputs. Thus, this mechanization requires 12 multiplexers, each made up of three logic gates, for a total of 36 logic gates.

Mechanization of the error character generator can be further simplified by determining an appropriate invalid 4-bit code to send with a valid disparity. A 4-bit binary code provides sixteen combinations. As set forth in the aforementioned U.S. Pat. No. 4,486,739, fourteen of the sixteen combinations are valid 4-bit codes. The two invalid 4-bit codes are 0000 and 1111. Since the 6-bit segment of the error character has neutral disparity, the disparity of the 4-bit segment can be utilized to determine the disparity of the 10-bit error character. When the invalid 10-bit error character is to have positive disparity, the 4-bit segment is 1111, while when the invalid 10-bit error character is to have negative disparity, the 4-bit segment is 0000. Combining the disparity neutral 6-bit segment with the positive disparity 4-bit segment 1111 results in an invalid 10-bit character of positive disparity, while combining the disparity neutral 6-bit segment with the negative disparity 4-bit segment 0000 results in an invalid 10-bit character of negative disparity.

Generating a valid 10-bit character of negative disparity requires combining the disparity neutral 6-bit segment with a 4-bit segment of negative disparity which results in a valid 10-bit character. Likewise, generating a valid 10-bit character of positive disparity requires combining the disparity neutral 6-bit segment with a 4-bit segment of positive disparity which results in a valid 10-bit character. The ten bit positions of the 10-bit character can be designated "a, b, c, d, e, f, g, h, i, and j," respectively. While various combinations of 6-bit segments of neutral disparity and 4-bit segments of appropriate disparity might be utilized, it has been found advantageous to use the encoded D3.0 character shown in Table IV of U.S. Pat. No. 4,486,739 to provide both the disparity neutral 6-bit segment and the 4-bit segment which determines the disparity of the 10-bit character. That D3.0 character has in bit positions a, b, c, d, e, and i the respective binary numerals 110001. In bit positions f, g, h, and j the D3.0 character has the respective binary numbers 1011 when the RDI signal is negative, or binary 0, and the respective binary numbers 0100 when the RDI signal is positive, or binary 1. Thus, this D3.0 character can be used to generate 10-bit characters of pre-selected disparity.

When the mode signal is 0 and an invalid 10-bit character is to be generated, the same disparity neutral 6-bit segment can be used. Then, when the invalid 10-bit character is to have positive disparity, the 4-bit segment f, g, h, and j can be binary 1111, and when the invalid 10-bit character is to have negative disparity, the 4-bit segment can be binary 0000.

Table 2 summarizes the manner in which the D3.0 characters can be utilized to generate the appropriate 10-bit error characters.

TABLE 2

| MODE | RDI | Bit Positions abcdei | Bit Positions fghj |
|---|---|---|---|
| 0 | 0 | 110001 | 1111 |
| 0 | 1 | 110001 | 0000 |
| 1 | 0 | 110001 | 0100 |
| 1 | 1 | 110001 | 1011 |

FIG. 5 is a block diagram of an error character generator based on this D3.0 character which is suitable for use as error character generator 26. In the error character generator of FIG. 5, the RDI signal on line 14 is applied to one input of exclusive NOR ("XNOR") circuit 120 and to the input of inverter 122. The mode control signal on line 28 is applied to the second input of XNOR circuit 120. At combining circuit 124, the single bit output of XNOR circuit 120 on line 126 is fanned out and used for bit positions f, h, and j, while the single bit output of inverter 122 on line 128 is used for bit position g, and the valid 6-bit character of neutral disparity on line 130 is used for bit positions a, b, c, d, e, and i, thus providing the 10-bit error character on line 30.

When the RDI signal is negative, or binary 0, and the mode control signal is 0, XNOR circuit 120 provides binary ones for bit positions f, h, and j, and inverter 122 provides a binary one for bit position g. When the mode control signal on line 28 is 0 and the RDI signal on line 14 is positive, or binary one, XNOR circuit 120 provides a binary zero for bit positions f, h, and j, and inverter 122 provides a binary zero for bit position g. When the mode control signal on line 28 is 1 and the RDI signal on line 14 is negative, or binary 0, XNOR circuit 120 provides a binary zero for bit positions f, h, and j, while inverter 122 provides a binary one for bit position g. When the mode control signal on line 28 is one and the RDI signal on line 14 is positive, or binary one, XNOR circuit 120 provides a binary one for bit positions f, h, and j, and inverter 122 provides a binary zero for bit position g. Thus, the combination of XNOR circuit 120 and inverter 122 provides the necessary binary signals for bit positions f, g, h, and j, and when these outputs are combined with the valid 6-bit character of neutral disparity making up bit positions a, b, c, d, e, and i, the desired 10-bit error character is created.

The circuit of FIG. 5 provides the 10-bit error character with minimum mechanization requirements. Combining circuit 124 requires no implementation, since the ten conductors comprising line 30 are made up of the six conductors of line 130, the three conductors of line 126, and the conductor of line 128. Thus a single XNOR gate and an inverter generate the necessary 10-bit error character.

Although the present invention has been described with reference to preferred embodiments, various alterations, rearrangements, and substitutions could be made, and still the result would be within the scope of the invention.

What is claimed is:

1. An error generating circuit for generating a 10-bit error character to test 8-bit/10-bit decoders, said error generating circuit comprising:

a source of a two-state disparity control signal;

a source of a two-state mode control signal; and a character generator for generating a 10-bit error character of a first type when the disparity control signal is in its first state and the mode control signal is in its first state, generating an 10-bit error character of a second type when the disparity control signal is in its second state and the mode control signal is in its first state, generating a 10-bit error character of a third type when the disparity control signal is in its first state and the mode control signal is in its second state, and generating a 10-bit error character of a fourth type when the disparity control signal is in its second state and the mode control signal is in its second state.

2. An error generating circuit as claimed in claim 1, wherein said character generator generates an invalid 10-bit character having positive disparity when the disparity control signal is in its first state and the mode control signal is in its first state, generates an invalid 10-bit character having negative disparity when the disparity control signal is in its second state and the mode control signal is in its first state, generates a valid 10-bit character having negative disparity when the disparity control signal is in its first state and the mode control signal is in its second state, and generates a valid 10-bit character having positive disparity when the disparity control signal is in its second state and the mode control signal is in its second state.

3. An error generating circuit as claimed in claim 1, wherein said character generator comprises:

a source of an invalid 10-bit character having positive disparity;

a source of an invalid 10-bit character having negative disparity;

a source of a valid 10-bit character having negative disparity;

a source of a valid 10-bit character having positive disparity;

a first signal control circuit for outputting the invalid 10-bit character having positive disparity when the disparity control signal is in its first state and outputting the invalid 10-bit character having negative disparity when the disparity control signal is in its second state;

a second signal control circuit for outputting the valid 10-bit character having negative disparity when the disparity control signal is in its first state and outputting the valid 10-bit character having positive disparity when the disparity control signal is in its second state; and a third signal control circuit for outputting the output of said first signal control circuit as the 10-bit error character when the mode control signal is in its first state and outputting the output of said second signal control circuit when the mode control signal is in its second state.

4. An error generating circuit as claimed in claim 3, wherein each signal control circuit comprises a multiplexer.

5. An error generating circuit as claimed in claim 1, wherein said character generator comprises:

a source of an invalid 10-bit character having positive disparity;

a source of an invalid 10-bit character having negative disparity;

a source of a valid 4-bit character having negative disparity;

a source of a valid 4-bit character having positive disparity;

a source of a valid 6-bit character having neutral disparity;

a first signal control circuit for combining the valid 4-bit character having negative disparity and the 6-bit character when the disparity control signal is in its first state, and combining the valid 4-bit character having positive disparity and the 6-bit character when the disparity control signal is in its second state;

a second signal control circuit for providing the invalid 10-bit character having positive disparity as the 10-bit test character when the disparity control signal is in its first state and the mode control signal is in its first state, providing the invalid 10-bit character having negative disparity as the 10-bit test character when the disparity control signal is in its second state and the mode control signal is in its first state, and providing the output of said first signal control circuit as the 10-bit test character when the mode control signal is in its second state.

6. An error generating circuit as claimed in claim 5, wherein each signal control circuit comprises a multiplexer.

7. An error generating circuit as claimed in claim 1, wherein said character generator comprises:
- a source of an invalid 4-bit character having positive disparity;
- a source of an invalid 4-bit character having negative disparity;
- a source of a valid 4-bit character having negative disparity;
- a source of a valid 4-bit character having positive disparity;
- a source of a valid 6-bit character having neutral disparity;
- a first signal control circuit for outputting the invalid 4-bit character having positive disparity when the disparity control signal is in its first state and outputting the invalid 4-bit character having negative disparity when the disparity control signal is in its second state;
- a second signal control circuit for outputting the valid 4-bit character having negative disparity when the disparity control signal is in its first state and outputting the valid 4-bit character having positive disparity when the disparity control signal is in its second state; and
- a third signal control circuit for combining the output of said first signal control circuit and the 6-bit character as the 10-bit error character when the mode control signal is in its first state and combining the output of said second signal control circuit and the 6-bit character as the 10-bit error character when the mode control signal is in its second state.

8. An error generating circuit as claimed in claim 7, wherein each signal control circuit comprises a multiplexer.

9. An error generating circuit as claimed in claim 1, wherein said character generator comprises:
- a source of a valid 6-bit binary signal having neutral disparity to provide six bits of the 10-bit error character;
- a first signal generating circuit for generating a first single bit binary signal to provide three bits of the 10-bit character, the three bits being binary ones when the mode control signal is in its first state and the disparity control signal is in its first state and when the mode control signal is in its second state and the disparity control signal is in its second state and being binary zeros when the mode control signal is in its first state and the disparity control signal is in its second state and when the mode control signal is in its second state and the disparity control signal is in its first state; and
- a second signal generating circuit for generating a second single bit binary signal to provide one bit of the 10-bit error character, the second single bit being a binary zero when the disparity control signal is in its first state and being a binary one when the disparity control signal is in its second state.

10. An error generating circuit as claimed in claim 9, wherein said first signal generating circuit comprises an exclusive-NOR gate, and said second signal generating circuit comprises an inverter.

11. A test circuit for testing 8-bit/10-bit decoders, said test circuit comprising:
- a source of a two-state mode control signal;
- a source of a two-state enable signal;
- an 8-bit/10-bit encoder, for encoding a valid 8-bit character in accordance with an input disparity signal to provide a valid 10-bit character and an output disparity signal;
- a delay circuit for delaying the output disparity signal and applying the delayed output disparity signal to said 8-bit/10-bit encoder as the input disparity signal;
- an error character generator for generating a 10-bit error character of a first type when the mode control signal is in its first state and the input disparity signal is in its first state, generating a 10-bit error character of a second type when the mode control signal is in its first state and the input disparity signal is in its second state, generating a 10-bit error character of a third type when the mode control signal is in its second state and the input disparity signal is in its first state, and generating a 10-bit error character of a fourth type when the mode control signal is in its second state and the input disparity signal is in its second state, and
- a signal selection circuit providing the valid 10-bit character for use as an input to the 8-bit/10-bit decoder when the enable signal is in its first state and providing the 10-bit error character for use as an input to the 8-bit/10-bit decoder when the enable signal is in its second state.

12. A test circuit as claimed in claim 11, wherein said error character generator comprises:
- a source of a valid 6-bit binary signal having neutral disparity to provide six bits of the 10-bit error character;
- a first signal generating circuit for generating a first single bit binary signal to provide three bits of the 10-bit character, the three bits being binary ones when the mode control signal is in its first state and the disparity control signal is in its first state and when the mode control signal is in its second state and the disparity control signal is in its second state and being binary zeros when the mode control signal is in its first state and the disparity control signal is in its second state and when the mode control signal is in its second state and the disparity control signal is in its first state; and
- a second signal generating circuit for generating a second single bit binary signal to provide one bit of the 10-bit error character, the second single bit being a binary zero when the disparity control signal is in its first state and being a binary one when the disparity control signal is in its second state.

13. A method of generating a 10-bit error character for testing 8-bit/10-bit decoders, said method comprising the steps of:
- (a) providing a two-state disparity control signal;
- (b) providing a of a two-state mode control signal; and
- (c) when the disparity control signal is in its first state and the mode control signal is in its first state, generating an 10-bit error character of a first type;
- (d) when the disparity control signal is in its second state and the mode control signal is in its first state, generating a 10-bit error character of a second type;

(e) when the disparity control signal is in its first state and the mode control signal is in its second state, generating a 10-bit error character of a third type;

(f) when the disparity control signal is in its second state and the mode control signal is in its second state, generating a 10-bit error character of a fourth type.

14. A method of generating a 10-bit error character for testing of 8-bit/10-bit decoders, said method comprising the steps of:

(a) providing a valid 6-bit binary signal having neutral disparity;

(b) providing a two-state mode control signal;

(c) providing a two-state disparity control signal;

(d) when the mode control signal is in its first state and the disparity control signal is in its first state, generating a single bit binary signal to provide three bits of the 10-bit character, the three bits being binary ones;

(e) when the mode control signal is in its second state and the disparity control signal is in its second state, generating a single bit binary signal to provide three bits of the 10-bit character, the three bits being binary ones;

(f) when the mode control signal is in its first state and the disparity control signal is in its second state, generating a single bit binary signal to provide three bits of the 10-bit character, the three bits being binary zeros;

(g) when the mode control signal is in its second state and the disparity control signal is in its first state, generating a single bit binary signal to provide three bits of the 10-bit character, the three bits being binary zeros;

(h) when the disparity control signal is in the first state, generating a binary zero to provide one bit of the 10-bit error character;

(i) when the disparity control signal is in the second state, generating a binary one to provide one bit of the 10-bit error character; and (j) combining the signal resulting from step (a) with the signal resulting from steps (d)–(g) and the signal resulting from steps (h)–(i) to generate the 10-bit error character.

15. A method of generating a 10-bit error character for testing of 8-bit/10-bit decoders, said error method comprising the steps of:

(a) providing a two-state mode control signal;

(b) providing a two-state disparity control signal;

(c) providing a valid 6-bit binary signal having neutral disparity;

(d) when the mode control signal is in its first state and the disparity control signal is in its first state, combining the 6-bit binary signal with a 3-bit binary signal having binary ones for its three bits and with a single bit binary zero signal to generate the 10-bit error character;

(e) when the mode control signal is in its second state and the disparity control signal is in its second state, combining the 6-bit binary signal with a 3-bit binary signal having binary ones for its three bits and with a single bit binary one signal to generate the 10-bit error character;

(f) when the mode control signal is in its first state and the disparity control signal is in its second state, combining the 6-bit binary signal with a 3-bit binary signal having binary zeros for its three bits and with a single bit binary one signal to generate the 10-bit error character; and (g) when the mode control signal is in its second state and the disparity control signal is in its first state, combining the 6-bit binary signal with a 3-bit binary signal having binary zeros for its three bits and with a single bit binary zero signal to generate the 10-bit error character.

16. A method of generating a 10-bit error character for testing of 8-bit/10-bit decoders, said method comprising the steps of:

(a) providing a 6-bit binary signal having neutral disparity for use as six bits of the 10-bit error character, (b) providing a two-state mode control signal;

(c) providing a two-state disparity control signal;

(d) when the mode control signal is in its first state and the disparity control signal is in its first state, providing a single bit binary one signal for use in generating three bits of the 10-bit error character;

(e) when the mode control signal is in its second state and the disparity control signal is in its second state, providing a single bit binary one signal for use in generating three bits of the 10-bit error character;

(f) when the mode control signal is in its first state and the disparity control signal is in its second state providing a single bit binary zero signal for use in generating three bits of the 10-bit error character;

(g) when the mode control signal is in its second state and the disparity control signal is in its first state providing a single bit binary zero signal for use in generating three bits of the 10-bit error character;

(h) when the disparity control signal is in its first state providing a single bit binary zero signal for use as one bit of the 10-bit error character;

(i) when the disparity control signal is in its second state providing a single bit binary one signal for use as one bit of the 10-bit error character; and (j) combining the signal resulting from step (a) with the three bits resulting from steps (d)–(g) and the signal resulting from steps (h)–(i) to provide the 10-bit error character.

17. A method of testing 8-bit/10-bit decoders, said method comprising the steps of:

(a) providing a two-state mode control signal;

(b) providing a two-state enable signal;

(c) encoding a valid 8-bit character in accordance with an input disparity signal to provide a valid 10-bit character and an output disparity signal;

(d) delaying the output disparity signal and using the delayed output disparity signal as the input disparity signal;

(e) when the mode control signal is in its first state and the input disparity signal is in a first state, generating a 10-bit error character of a first type;

(f) when the mode control signal is in its first state and the input disparity signal is in a second state, generating a 10-bit error character of second type;

(g) when the mode control signal is in its second state and the input disparity signal is in the first state, generating a 10-bit error character of a third type;

(h) when the mode control signal is in its second state and the input disparity signal is in the second state, generating a 10-bit error character of fourth type;

(i) when the enable signal is in its first state, providing the valid 10-bit character for use as an input to the 8-bit/10-bit decoder; and (j) when the enable signal is in its second state, providing the 10-bit error character for use as an input to the 8-bit/10-bit decoder.

* * * * *